(12) United States Patent
Davis et al.

(10) Patent No.: US 8,131,660 B2
(45) Date of Patent: Mar. 6, 2012

(54) RECONFIGURABLE HARDWARE ACCELERATOR FOR BOOLEAN SATISFIABILITY SOLVER

(75) Inventors: John Davis, San Francisco, CA (US); Zhangxi Tan, Albany, CA (US); Fang Yu, San Jose, CA (US); Lintao Zhang, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 12/099,160

(22) Filed: Apr. 8, 2008

(65) Prior Publication Data

US 2009/0254505 A1  Oct. 8, 2009

(51) Int. Cl.
*G06N 5/02* (2006.01)
(52) U.S. Cl. .......................................................... 706/46
(58) Field of Classification Search ........................ None
See application file for complete search history.

(56) References Cited

U.S. PATENT DOCUMENTS

| | | | |
|---|---|---|---|
| 6,038,392 | A | 3/2000 | Ashar et al. |
| 6,247,164 | B1 | 6/2001 | Ashar et al. |
| 6,292,916 | B1 | 9/2001 | Abramovici et al. |
| 6,415,430 | B1 * | 7/2002 | Ashar et al. .................. 716/105 |
| 6,442,732 | B1 | 8/2002 | Abramovici et al. |
| 2003/0084411 | A1 | 5/2003 | Moskewicz et al. |
| 2003/0225552 | A1 | 12/2003 | Ganai et al. |
| 2007/0011629 | A1 | 1/2007 | Shacham et al. |

OTHER PUBLICATIONS

Redekopp et al., A Parallel Pipelined SAT Solver for FPGA's, 2000, R.W. Hartenstein and H. Grunbacher, FPL 2000, pp. 462-468.*
Skliarova et al., A Software/Reconfigurable Hardware SAT Solver, 2001, IEEE, Apr. 2004, pp. 408-419.*
Abramovici et al., A SAT Solver Using Reconfigurable Hardware and Virtual Logic, 2000, Journal of Automated Reasoning, Feb. 2000, pp. 5-36.*
Bryan H. Fletcher, FPGA Embedded Process—Revealing True System Performance, 2005, Embedded Systems Conference San Francisco 2005, pp. 1-18.*
Platzner, et al., "Acceleration of Satisfiability Algorithms by Reconfigurable Hardware", In Proceedings of the 8th International Workshop on Field Programmable Logic and Applications (FPL98), Tallinn, Estonia, Springer-Verlag, 1998. pp 69-78.
Zhong, et al.,"An FPGA-Based SAT Solver Architecture with Near-Zero Synthesis and Layout Overhead", IEE Proceedings—Computers and Digital Techniques, vol. 147, Issue 3, May 2000 pp. 135-141.
Sklyarov, et al., "High-Level Design Tools for FPGA-Based Combinatorial Accelerators", Lecture Notes in Computer Science. vol. 2778/2003. Field-Programmable Logic and Applications—pp. 276-279.
Zhanqing, "Reconfigurable Hardware SAT Solving", A Thesis Submitted for the Degree of Master of Science, Department of Computer Science, School of Computing, National University of Singapore. 2003. 104 pages.

(Continued)

*Primary Examiner* — Jeffrey A Gaffin
*Assistant Examiner* — Paulinho E Smith
(74) *Attorney, Agent, or Firm* — Microsoft Corporation

(57) ABSTRACT

A hardware accelerator is provided for Boolean constraint propagation (BCP) using field-programmable gate arrays (FPGAs) for use in solving the Boolean satisfiability problem (SAT). An inference engine may perform implications. Block RAM (BRAM) may be used to store SAT instance information. Computation may be co-located with the BRAM memory, taking advantage of the high on-chip bandwidth and low latency of an FPGA. SAT instances may be partitioned into multiple groups that can be processed by multiple inference engines in parallel. New SAT instances can be inserted into FPGA without invoking the time-consuming FPGA re-synthesizing process.

17 Claims, 6 Drawing Sheets

OTHER PUBLICATIONS

Sousa, et al., "A Configware/Software Approach to SAT Solving", In: Proceedings of the IEEE Symposium on Field-Programmable Custom Computing Machines, May 2001. 10 pages.

Davis, et al., "A Machine Program for Theorem-Proving", Communications of the ACM, vol. 5, Issue 7. pp. 394-397. 1962.

Redekopp, et al., "A Parallel Pipelined SAT Solver for FPGA's", 10th International Conference on Field Programmable Logic and Applications. Aug. 2000. pp. 462-468.

Abramovici, et al., "A SAT Solver Using Reconfigurable Hardware and Virtual Logic", Journal of Automated Reasoning, vol. 24, No. 1-2, Feb. 2000, pp. 5-36.

Skliarova, et al., "A Software/Reconfigurable Hardware SAT Solver", IEEE Transactions on Very Large Scale Integration (VLSI) Systems, vol. 12, No. 4, Apr. 2004. pp. 408-419.

Zhao, et al., "Accelerating Boolean Satisfiability through Application Specific Processing", Proceedings: The 14th International Symposium on System Synthesis, 2001. pp. 244-249.

Gomes, et al., "Boosting Combinatorial Search Through Randomization", In Proc. AAAI98, Madison, WI, Jul. 1998. pp.431-437.

Moskevic, et al., "Chaff: Engineering an Efficient SAT Solver", Design Automation Conference, 2001 Proceedings, 2001 pp. 530-535.

Kirkpatrick, et al., "Critical Behavior in the Satisfiability of Random Boolean Formulae", Science, vol. 264, May 1994, pp. 1297-1301.

Een, et al., "Effective Preprocessing in SAT through Variable and Clause Elimination", In Proc. 8th Intl. Conf. on Theory and Applications of Satisfiability Testing (SAT'05), Lecture Notes in Computer Science (LNCS), vol. 3569, Springer 2005. pp. 1-15.

"HyperTransport™ I/O Link Specification" Revision 1.03, HyperTransport Technology Consortium. Dated Oct. 10, 2001. 217 Pages.

Kuon, et al., "Measuring the Gap between FPGAs and ASICs", FPGA'06, Feb. 22-24, 2006, Monterey, California, USA. 10 Pages.

Skliarova, et al., "Reconfigurable Hardware SAT Solvers: A Survey of Systems", IEEE Transactions on Computers, Nov. 2004 (vol. 53, No. 11) pp. 1449-1461.

Zhong, et al., "Solving Boolean Satisfiability with Dynamic Hardware Configurations", Lecture Notes in Computer Science; vol. 1482, Proceedings of the 8th International Workshop on Field-Programmable Logic and Applications, From FPGAs to Computing Paradigm.1998. pp. 326-335.

Suyama, et al., "Solving Satisfiability Problems Using Reconfigurable Computing", IEEE Transactions on Very Large Scale Integration (VLSI) Systems, vol. 9, No. 1, Feb. 2001. pp. 109-116.

Zhang, et al., "The Quest for Efficient Boolean Satisfiability Solvers", Lecture Notes in Computer Science; vol. 2404 Proceedings of the 14th International Conference on Computer Aided Verification. 2002. pp. 17-36.

Zhong, et al.,"Using Configurable Computing to Accelarate Boolean Satisfiability", IEEE Transactions on Computer-Aided Design of Integrated Circuits and Systems, vol. 18, Issue 6, Jun. 1999 pp. 861-868.

Xilinx, XPower Estimator, http://www.xilinx.com/products/design_resources/power_central/.

* cited by examiner

RECONFIGURABLE HARDWARE ACCELERATOR FOR BOOLEAN SATISFIABILITY SOLVER

BACKGROUND

The Boolean satisfiability problem (SAT) is a decision problem whose instance is a Boolean expression written using only AND, OR, NOT, variables, and parentheses. A formula of propositional logic is said to be satisfiable if logical values can be assigned to its variables in a way that makes the formula true.

Hardware assisted SAT solving has attracted much research in recent years. Conventional hardware solvers are slow and capacity limited, rendering them either obsolete and/or severely constrained.

SUMMARY

A hardware accelerator is provided for Boolean constraint propagation (BCP) using field-programmable gate arrays (FPGAs) for use in solving the Boolean satisfiability problem (SAT). An inference engine may perform implications. Block RAM (BRAM) may be used to store SAT instance information. SAT instances may be partitioned into sets of clauses that can be processed by multiple inference engines in parallel.

In an implementation, the inference engine may infer new implications from new variable assignments. Each inference engine may be in charge of a number of clauses. The information of these clauses, such as the literals and their corresponding values, may be stored locally in FPGA BRAM. Multiple inference engines can operate in parallel to perform inferences on the same newly assigned variable.

In an implementation, clauses may be partitioned and groups of clauses may be distributed across multiple inference engines. Finding the optimal partitioning that uses the least amount of memory is an NP hard problem. A clause partitioning technique generates high quality partitions.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

A field-programmable gate array (FPGA) based accelerator may be used to solve Boolean satisfiability problems (SAT). Boolean constraint propagation (BCP) is accelerated by moving unit implication functionality to the FPGA. An application-specific architecture may be used instead of an instance-specific one to avoid time consuming FPGA synthesis for each SAT instance. SAT instances may be loaded into an application-specific FPGA BCP co-processor. Block random access memory (block RAM or BRAM) in the FPGA may be used to store instance-specific data. This reduces the instance loading overhead and simplifies the design of the interface with the host CPU.

Figure 1:
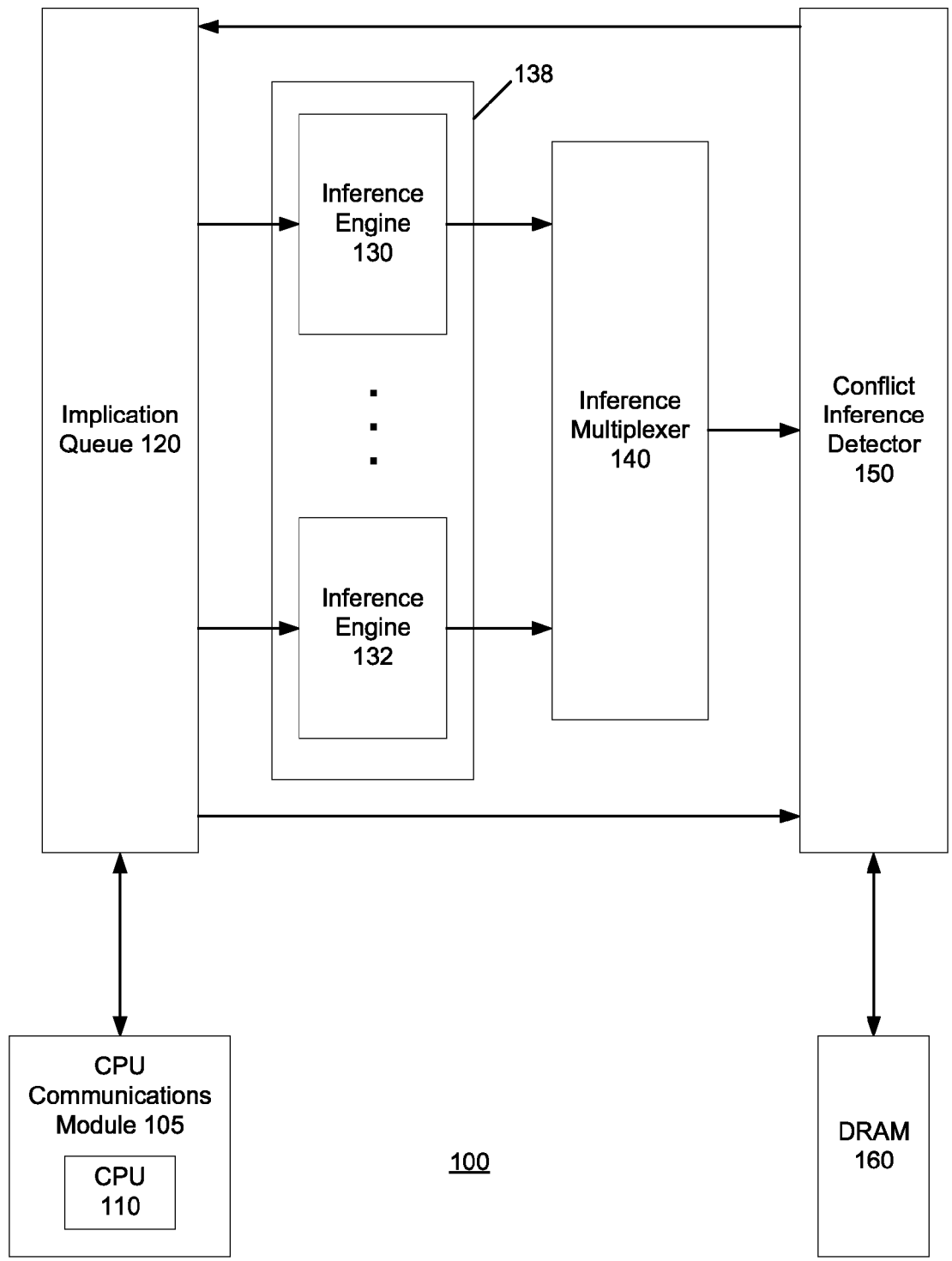
FIG. 1 is a block diagram of an implementation of a hardware SAT accelerator system.

FIG. 1 is a block diagram of an implementation of a hardware SAT accelerator system 100. An example hardware accelerator may be a FPGA Boolean constraint propagation accelerator. A CPU communication module 105 receives branch decisions from a CPU 110, and may return inference results back to the CPU 110.

One or more implication inference engines 130, 132 (referred to herein as inference engines) are provided in parallel as part of an inference module 138. Each inference engine 130, 132 may store a set of clauses. Clauses of the SAT formula may be partitioned and stored in multiple parallel inference engines. Given a decision, inferences may be performed in parallel. Although only two inference engines 130, 132 are shown, it is contemplated that any number of inference engines may be implemented in a hardware SAT accelerator system 100.

An implication queue 120 comprising storage such as a first input first output (FIFO) buffer is provided. Decisions from the CPU 110 and implications derived from one or more of the inference engines 130, 132 may be queued in the implication queue 120 and sent to the one or more of the inference engines 130, 132. The implication queue 120 may store the implications performed and send the implications to the CPU 110.

An inference multiplexer 140 serializes inference results from the inference engines 130, 132. The inference multiplexer 140 also may serialize the data communications between the inference engines 130, 132 and a conflict inference detector 150. The conflict inference detector 150 may store global variable values and may detect conflict inference results generated by the inference engines 130, 132. In an implementation, the conflict inference detector may comprise a global status table in on-chip RAM that tracks variable status, and a local undo module that, when a conflict occurs, un-assigns variables (e.g., still in a buffer) and reports the results (e.g., at the same time) to the CPU 110.

It is contemplated that the choices of heuristics such as branching order, restarting policy, and learning and backtracking may be implemented in software, e.g., in the CPU 110.

In an implementation, the accelerator may be partitioned across multiple FPGAs, multiple application specific integrated circuits (ASICs), a combination of one or more FPGAs and ASICS, or may comprise a central controller chip comprising the conflict inference detector 150 and the CPU communication module 105 and a plurality of chips comprising the implication queue 120, the inference engines 132, 134, and the inference multiplexer 140.

Figure 2:
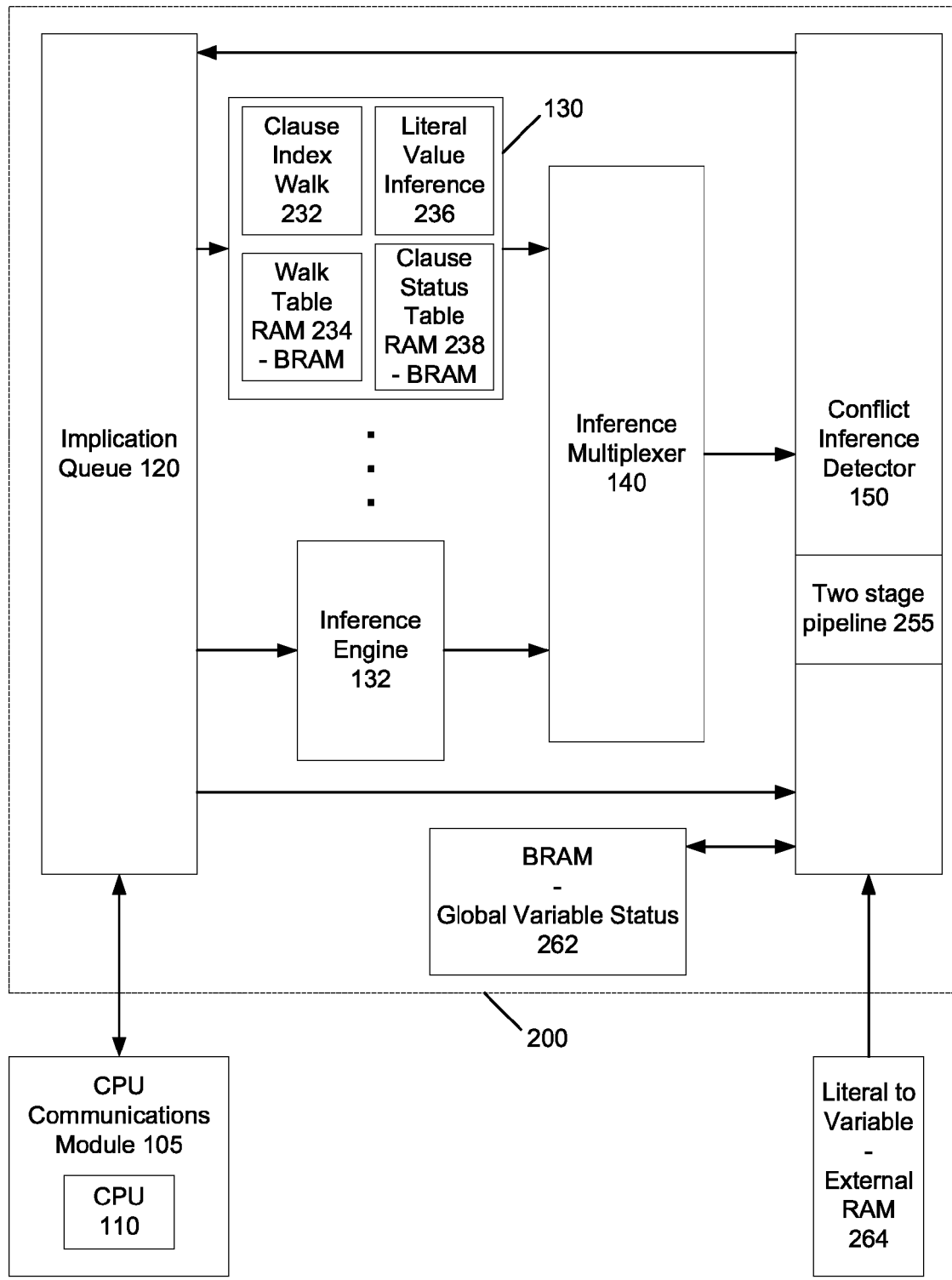
FIG. 2 is a block diagram of an implementation of a FPGA BCP co-processor.

FIG. 2 is a block diagram of an implementation of a FPGA BCP co-processor 200. The implication queue 120, the inference engines 132, 134, the inference multiplexer 140, and the conflict inference detector 150 may be implemented using one or more FPGAs. An FPGA is a semiconductor device containing programmable logic components called "logic blocks" and programmable interconnects. Logic blocks can be programmed to perform the function of basic logic gates such as AND and XOR, or more complex combinational functions such as decoders or mathematical functions. In most FPGAs, the logic blocks also include memory elements, which may be flip-flops or more complete blocks of memory.

Each inference engine may comprise a clause index walk 232, a walk table 234, a literal value inference 236, and a clause status table 238, described further below. The conflict inference detector 150 may comprise a two stage pipeline 255 for communicating with the implication queue 150 and memory such as global variable status BRAM 262 and literal to variable external RAM 264.

Given a new variable assignment, the SAT solver may infer the implications caused by the new assignment and current variable assignments. To accomplish this, the clause information may be stored. Each FPGA has block RAM (BRAM) 262 which is distributed around the FPGA with configurable logics (e.g., lookup tables or LUTs). BRAM 262 may be used to store clause information, thus avoiding re-synthesis of the logic in the FPGA. In this manner, in an implementation, a new instance of the Boolean satisfiability formula may be inserted into memories on the FPGA without invoking an FPGA re-synthesizing process. Multiple BRAM blocks may be accessed at the same time to provide the bandwidth and parallelism. Moreover, BRAM 262 can be loaded on the fly. In an implementation, BRAM 262 in the FPGA may be dual ported.

Clauses may be partitioned into non-overlapping groups so that each literal only occurs at most p times in each group, where p may be restricted to be a small number, e.g., one or two. In an implementation, the clauses may be partitioned by the CPU 110. Each group of clauses may be processed by an inference engine. Thus, by limiting p, multiple inference engines (e.g., inference engines 130, 132) may process literal assignments in parallel rather than serially. Given a newly assigned variable, each inference engine may work on at most p related clauses, a process that takes a fixed number of cycles. Enough BRAM may be allocated for each inference engine to store c clauses, with c being a fixed number for all engines (e.g., 1024). In this way, an array of inference engines may run in parallel, synchronously. By partitioning clauses into groups, the number of inference engines can be significantly smaller than the number of clauses, more efficiently utilizing FPGA resources.

In an implementation, p may be larger than one because slightly larger p can help reduce the number of inference engines that are used. This may be helpful for long clauses because they share variables with many other clauses. It is noted that p and c may be adjusted to optimize the number of inference engines and the memory utilization within the inference engine. An implementation of a partitioning technique is described further herein.

Regarding a clause partition for inference engines, as mentioned previously, the number of clauses associated with any inference engine may be limited to be at most c clauses, and the maximum number of occurrences of any variable in an inference engine may be limited to be p. A technique for partitioning a SAT instance into sets of clauses that satisfy these restrictions is described.

If each literal is restricted to be associated with at most one clause (p=1) in each group, and an unlimited group size (e.g., c=∞) is permitted, the problem becomes a graph coloring problem. Each vertex in the graph represents a clause. An edge between two vertices denotes that these two clauses share a common literal. The graph coloring process ensures that no two adjacent vertices have the same color. This process is equivalent to dividing the clauses into groups with each color denoting a group and no two clauses in a group sharing any literal. Therefore, graph coloring techniques may be used to solve a relaxed partitioning problem (c=∞ and p=1).

Figure 3:
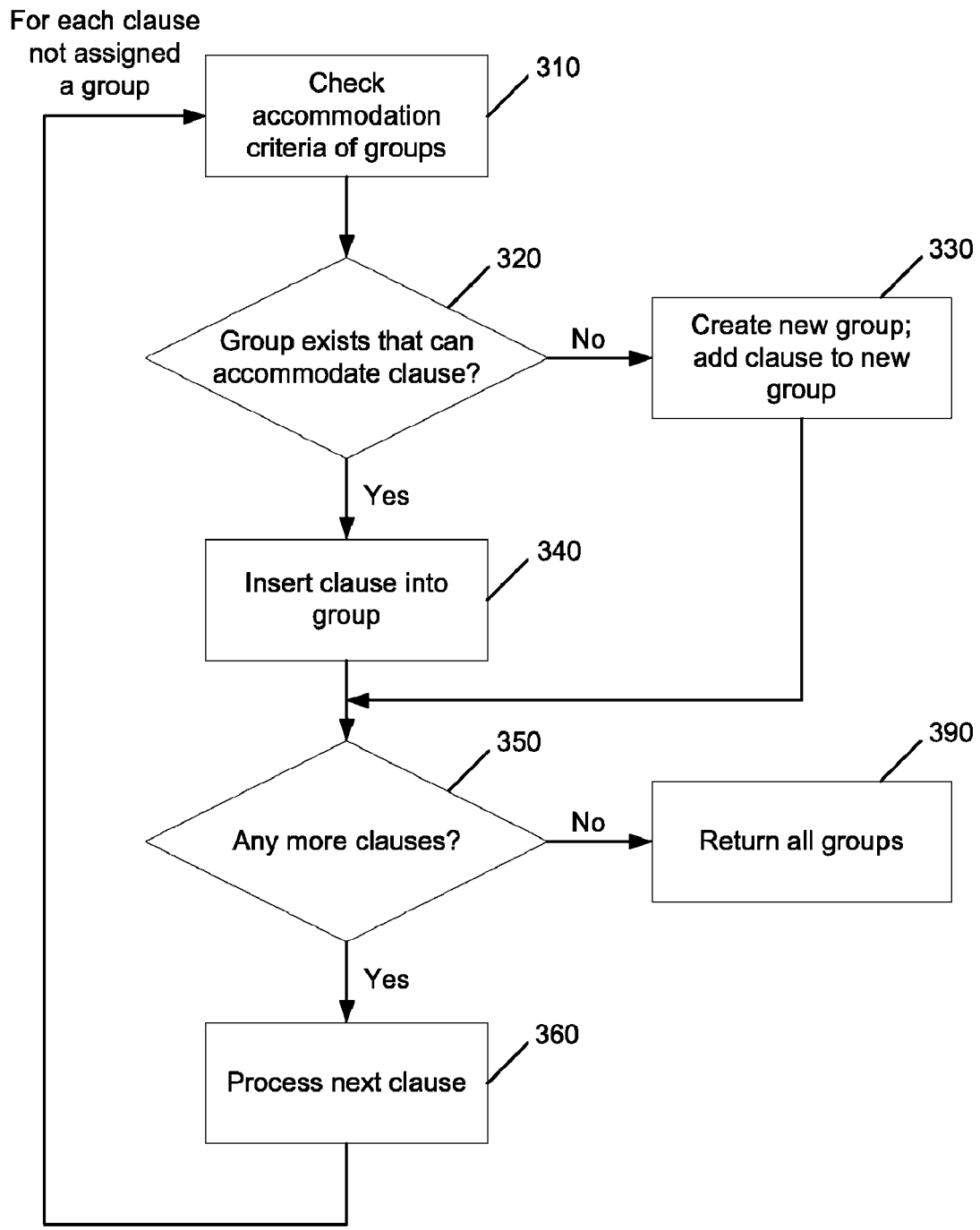
FIG. 3 is an operational flow of an implementation of a method for clause partitioning.

The graph coloring problem is a well known NP complete problem and has been extensively studied. A greedy algorithm may be used to partition the clauses. The clauses may be partitioned in multiple inference engines. Pseudo-code is provided below and FIG. 3 is an operational flow of an implementation of a method 300 for clause partitioning. For the pseudo-code, the input comprises a clauses list C, and the maximum number of clauses associated with one variable is p, and the output comprises groups of clauses, with each group fitting into one inference engine.

1 Begin
2 Groups G=0
3 For each clause $C_i$ that has not been assigned a group yet
4 For each group $G_i$ in G
5 For each variable $V_j$ in $C_i$
6 If $V_j$ has p related clauses in group $G_i$ already
7 pass to next group $G_i+1$ (Goto line 4);
8 End for
9 assign $C_i$ to the group $G_i$;
10 pass to next clause (Goto line 3);
11 End for
12 Create a new group $G_{new}$ and add it to G;
13 Add clause $C_i$ to group $G_{new}$;
14 End for
15 Return all groups in G
16 End An example greedy clause partitioning technique, described with respect to FIG. 3, begins with zero groups. The method loops through the clauses that have not been assigned a group, and for each clause, inserts the clause into the first (or in an implementation, the best) group $G_i$ that can accommodate it. At operation 310, the accommodation criteria are checked (e.g., lines 5-8 of the pseudo-code). For each variable in clause $C_i$, there should be no more than p−1 related clauses in group $G_i$.

If a group $G_i$ exists that can accommodate this clause as determined at operation 320, the clause is inserted into the group at operation 340. Otherwise, at operation 330, a new group (line 12) is created and the clause is added to the new group (line 13).

It may be determined at operation 350 whether any more clauses are to be processed. If so, the next clause may be processed at operation 360, with processing continuing at operation 310. If there are no more clauses to be processed, all groups in G may be returned at operation 390. This technique is polynomial with respect to the size of the input.

Figure 4:
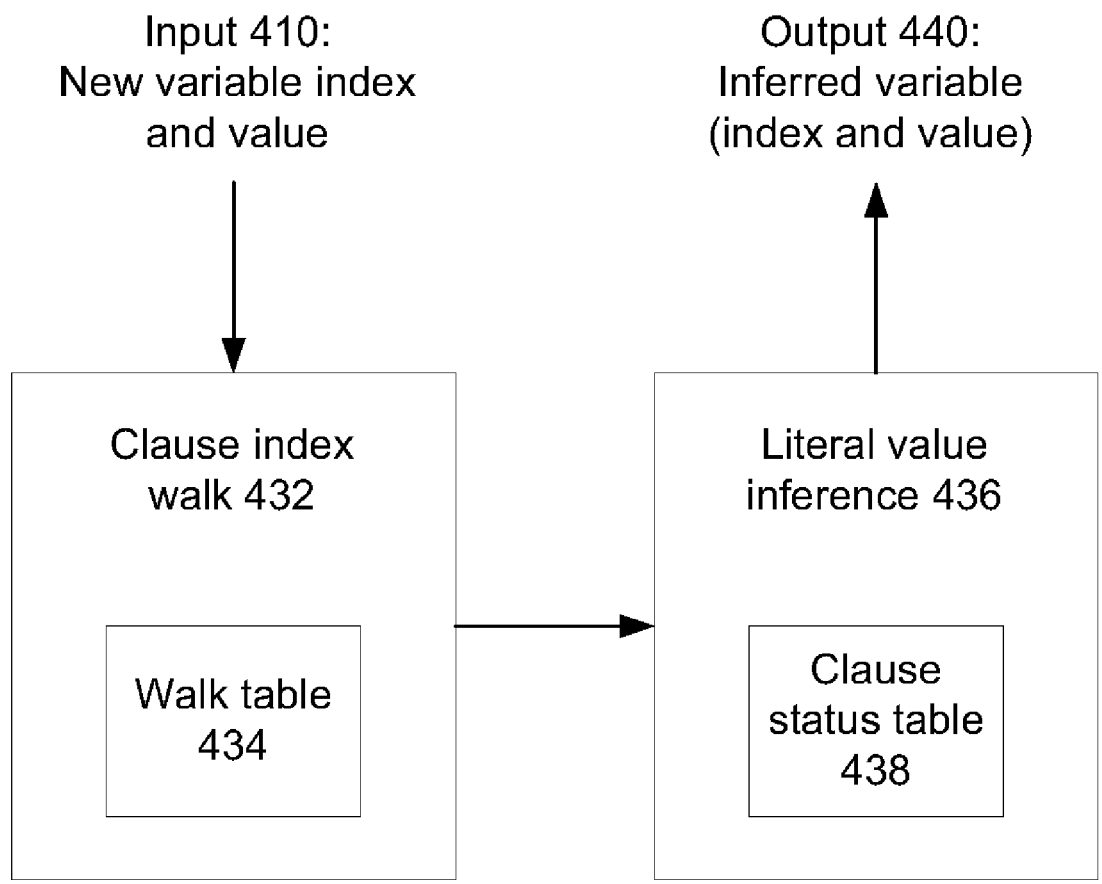
FIG. 4 is a diagram of an implementation of an implication process that may be used by an inference engine.

Each inference engine may use a two part operation to process new variable assignments and produce any new implications, as described with respect to FIG. 4. FIG. 4 is a diagram of an implementation of an implication process 400 that may be used by an inference engine. At 432, using a new variable index and value as an input 410, the inference engine (e.g., the inference engine 130) may determine whether the assigned variable is related to any clauses stored in the inference engine, and if so, may identify these clauses. A walk table 434 may be used. At 436, the inference engine may examine these clauses to determine whether they imply a new variable. A clause status table 438 may be used. An output 440 may comprise an inferred variable comprising an index and value.

Regarding literal occurrence lookup, at 432, given a newly assigned variable as input 410, the inference engine may locate the clause associated with the variable that can generate implications. In a software SAT solver, this can be implemented by associating each variable with an array of its occurrence (an occurrence list). A more efficient implementation may only store the watched clauses in each array (a watched list). This optimization reduces the number of clauses to be examined, but does not reduce the total number of arrays, which is proportional to the number of variables.

In an implementation, given an inference engine, each variable has at most p occurrences and most variables will have no occurrence at all. Storing an entry for each variable in every inference engine is an inefficient use of space since SAT benchmarks often contain thousands of variables. A possible solution for this problem is to use a content addressable memory (CAM), the hardware equivalent of a hash table, comprised within an FPGA. Alternatively, a tree walk technique may be implemented.

Figure 5:
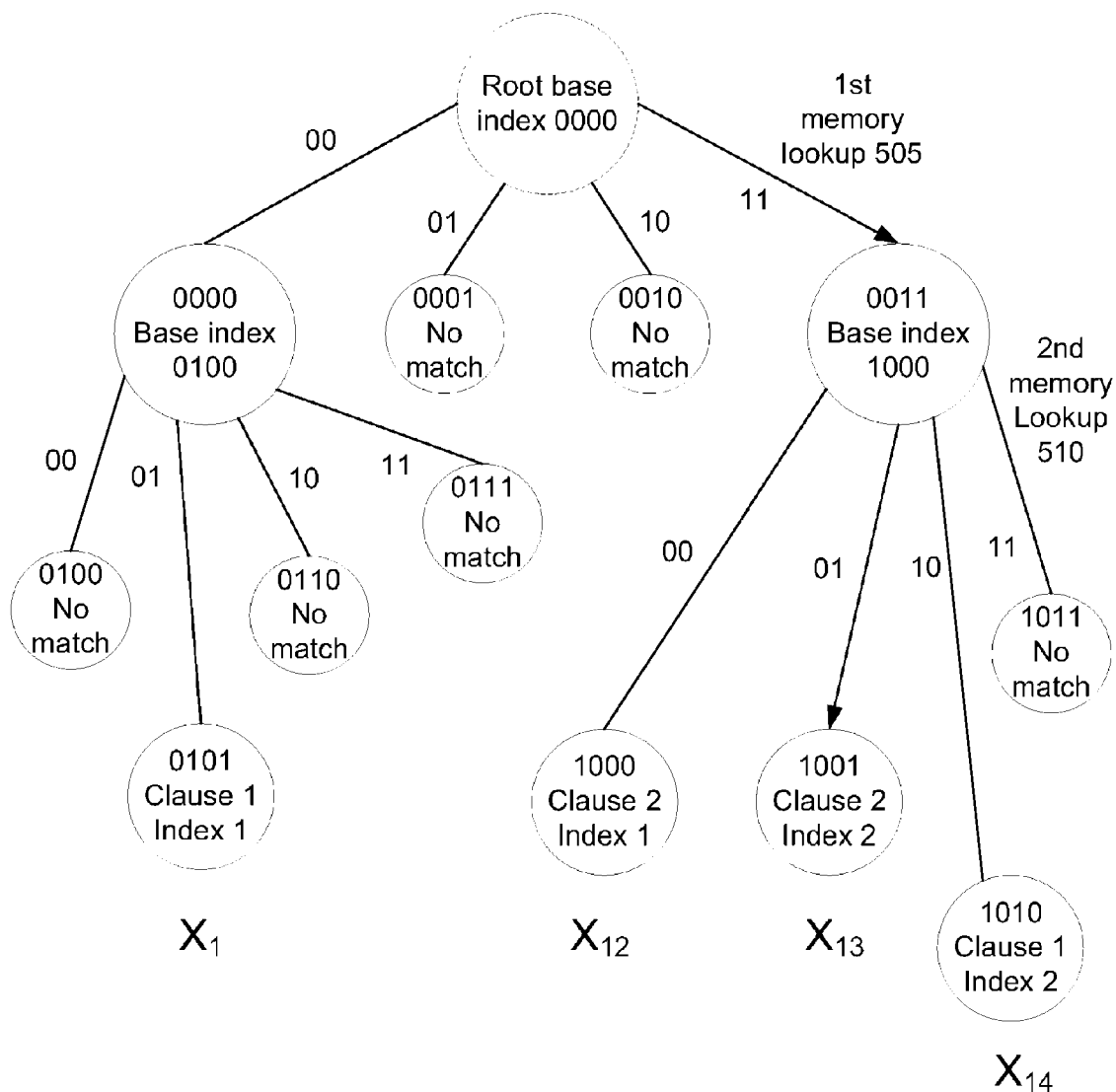
FIG. 5 is a diagram of an example clause index tree.

FIG. 5 is a diagram of an example clause index tree 500 and may be used to describe a clause index tree walk in the inference engine. A tree may be stored in the walk table 434, such as a tree walk table, e.g. in an on-chip BRAM 234 local to the inference engine 130. Suppose the variable index has a width of k (so that the accelerator can handle $2^k$ variables) and every non-leaf tree node has $2^m$ child nodes, then the tree will be k/m deep. Here both k and m are configurable. Given a non-leaf node, the address of its leftmost child in the tree walk table is called the base index of this tree node. The rest of the children are stored sequentially in the table following the leftmost child. Therefore, to locate the ith child, the index can be calculated by adding i to the base index. If a child is not associated with any clauses, a no-match (−1) tag may be stored in the entry. If for a node, all of its $2^m$ children have no-match, the tree node is not expanded and a no-match tag is stored in the node itself. The entry of a leaf node stores the clause ID where the variable occurs, as well as the literal index in the clause that corresponds to the variable.

FIG. 5 provides an example with a literal index size k=4 and a tree branch width m=2. There are two clauses ($x_1$ v $x_{14}$) and ($x_{12}$ v $x_{13}$), where variable $x_1$'s index is 0001, $x_{12}$'s index is 1100, $x_{13}$'s index is 1101, and $x_{14}$'s index is 1110. Suppose the newly assigned variable is 1101.

The arrows in the tree 500 represent the two memory lookups 505, 510 used to locate the clauses associated with the decision variable 1101 ($x_{13}$). The base index of the root node is 0000 and the first two bits of the input are 11. The table index is the sum of two: 0000+11=0011. Using this table index, the first memory lookup 505 is conducted by checking the 0011 entry of the table. This entry shows that the next lookup 510 is an internal tree node with the base index 1000. Following this base index, adding it to the next two bits of the input 01, the leaf node 1000+01=1001 is reached. This leaf node stores the variable association information; in this case, the variable is associated with the second variable of clause two.

Table 1 shows a clause index walk table for internal tree nodes, and illustrates the tree structure mapping to a table.

TABLE 1

| Table Index | Base Index |
|---|---|
| 0000 | 0100 |
| 0001 | −1 (No match) |
| 0010 | −1 (No match) |
| 0011 | 1000 |
| 0100-1011 | Leaf nodes |

Note the last m bits of the base index are all zeros. This is because each internal node has exactly $2^m$ children. Even if a child is not associated with any related clauses, the child's index is still stored, using a no-match tag. In such an implementation, the addition operation is not necessary. The top k−m bits of the base index may be used and concatenated with the input to obtain the table index, removing the need for a hardware adder and also saving one cycle.

Table 2 shows a clause index walk table for leaf tree nodes.

TABLE 2

| Table Index | Information stored at leaf nodes |
|---|---|
| 0100 | −1 |
| 0101 | CID 1, PID 1, positive |
| 0110 | −1 |
| 0111 | −1 |
| 1000 | CID 2, PID 1, negative |
| 1001 | CID 2, PID 2, positive |
| 1010 | CID 1, PID 2, positive |
| 1011 | −1 |

For a leaf node, the table stores the related clause information. It contains the clause ID (CID), the position in the clause (PID), and its sign (whether it is a positive or negative literal in the clause). This information may be used by the literal value inference module 436 for generating new inferences. Note that the CID does not need to be globally unique, as a locally unique ID is sufficient to distinguish different clauses associated with one inference engine.

It is contemplated that the mapping between a local CID to a global CID may be stored in dynamic random access memory (DRAM) and maintained by the conflict inference detector 150 of the system 100.

If p>1, each variable can be associated with p clauses per inference engine. They can be stored sequentially at the leaf nodes. The inference engine can process them sequentially with one implication module. If hardware resources permit, it is also possible to process them in parallel because they are associated with different clauses.

To store the tree in on-chip memory, the entire tree may be put into BRAM. In an implementation, an inference engine uses four cycles to identify the related clause in the BRAM. Using a single port of the BRAM, inference engines can service a new lookup every four cycles.

In an implementation, distributed RAM may be used to store the first two levels of the tree. Similar to BRAM, distributed RAM is also dynamically readable and writable, but with much smaller total capacity. Since the top two levels of tree are very small, they can fit into distributed RAM. The rest of the tree may be stored in BRAM. By doing this, the four cycle pipeline stage may be broken into two pipeline stages with two cycles each, thus improving inference engine throughput to lookups every two cycles.

Regarding inference generation, at 436, after finding a clause to examine, the clause that contains the newly assigned variable may be examined to see whether it infers any new implications. The literals' values in each clause may be stored in a separate BRAM called the clause status table 438.

In an implementation, an inference engine in the inference module 138 takes the output of the previous stage as inputs, which includes the CID, PID in addition to the variable's newly assigned value. With this information, it may examine the clause status table, update its status, and output possible implications in two cycles as output 440.

By using parallelism in hardware, it has been determined that the inference engines can infer implications in 6 to 17 clock cycles for a new variable assignment in an implementation. Simulation shows that the BCP accelerator is approximately 3 to 40 times faster than a conventional software based approach for BCP without learned clauses.

Thus, the BCP part of the SAT solving process may be accelerated in hardware. In an implementation, branching, restarting, and conflict analysis may be left to the software on the host CPU. An example system offloads 80 to 90 percent of the software SAT solver's computation. While this system may be mapped to an FPGA to reduce cost and speed-up development time, the system is also relevant to ASIC designs. The co-processor can load SAT instances in milliseconds, can handle SAT instances with tens of thousands of variables and clauses using a single FPGA, and can scale to handle more clauses by using multiple FPGAs.

Figure 6:
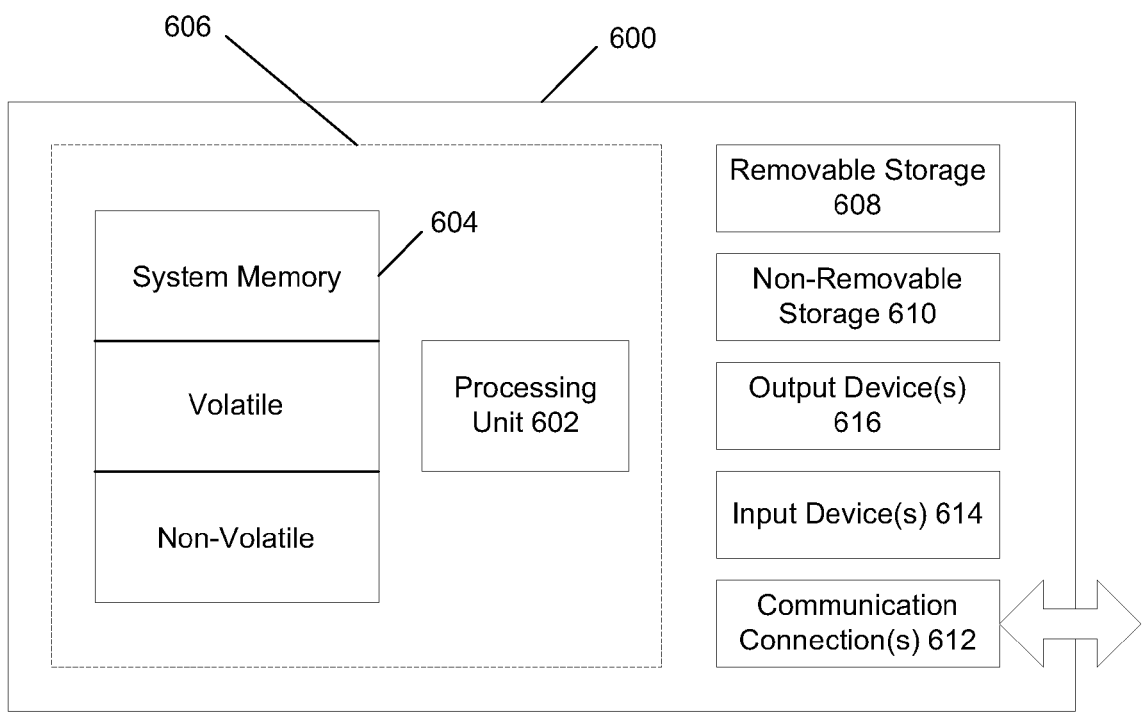
FIG. 6 shows an exemplary computing environment.

FIG. 6 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A hardware accelerator for a Boolean satisfiability solver, comprising:
    an inference module comprising a plurality of inference engines, each inference engine storing a set of clauses of a Boolean satisfiability formula; and
    an inference multiplexer that serializes a plurality of results from the inference engines, wherein each inference engine comprises a walk table and a clause status table, and the walk table comprises index information pertaining to each clause and the clause status table comprises values of literals in each clause.

2. The hardware accelerator of claim 1, further comprising an implication queue that stores and distributes to the inference engines in parallel new variable decisions or implications derived from at least one of the inference engines.

3. The hardware accelerator of claim 2, further comprising a conflict inference detector that detects conflict inference results generated by the inference engines.

4. The hardware accelerator of claim 3, wherein the conflict inference detector comprises:
- a global status table in on-chip random access memory (RAM) that tracks variable status; and
- a local undo module that, when a conflict occurs, un-assigns variables and reports results to a central processing unit (CPU).

5. The hardware accelerator of claim 3, further comprising at least one field-programmable gate array (FPGA) that comprises a communication module, the inference module, the implication queue, the inference multiplexer, the conflict inference detector, and dynamic random access memory (DRAM).

6. The hardware accelerator of claim 5, wherein the at least one FPGA comprises block random access memory (BRAM), the BRAM storing instance information of the Boolean satisfiability formula.

7. The hardware accelerator of claim 5, wherein the at least one FPGA performs Boolean constraint propagation.

8. The hardware accelerator of claim 5, wherein the hardware accelerator is partitioned across multiple FPGAs, multiple application specific integrated circuits (ASICs), a combination of one or more FPGAs and ASICS, or comprises a central controller chip comprising the conflict inference detector and the communication module and a plurality of chips comprising the implication queue, the inference engines, and the inference multiplexer.

9. The hardware accelerator of claim 5, wherein a new instance of the Boolean satisfiability formula can be inserted into memories on the at least one FPGA without invoking an FPGA re-synthesizing process.

10. The hardware accelerator of claim 3, further comprising at least one application specific integrated circuit (ASIC) that comprises a communication module, the inference module, the implication queue, the inference multiplexer, the conflict inference detector, and dynamic random access memory (DRAM).

11. The hardware accelerator of claim 1, wherein the inference engines are in parallel, and clauses stored in different inference engines are processed in parallel.

12. The hardware accelerator of claim 1, wherein each inference engine processes new variable assignments and produces new implications.

13. An implication method, comprising:
- receiving a variable index and a value of a variable as an input;
- determining whether the variable is related to a clause stored in an inference engine, wherein determining whether the variable is related to the clause stored in the inference engine is based on the variable index and the value;
- identifying the clause stored in an inference engine that is related to the variable; and
- determining whether the clause implies a new variable.

14. The method of claim 13, further comprising outputting an inferred variable comprising an index and a value responsive to determining whether the clause implies the new variable.

15. The method of claim 13, wherein determining whether the variable is related to a clause stored in an inference engine comprises performing a tree walk technique.

16. A method of clause partitioning, comprising:
- checking accommodation criteria to determine whether a group can accommodate a clause of an instance of a Boolean satisfiability formula, wherein the accommodation criteria comprise for each variable in the clause, there are no more than p-1 related clauses in the group, p being a predetermined number;
- if so, then inserting the clause into the group; and
- otherwise, creating a new group and inserting the clause into the new group.

17. The method of claim 16, further comprising:
- repeating the checking accommodation criteria for each clause that is not assigned to a group; and
- outputting each group and associating each group with an associated inference engine.

* * * * *